United States Patent [19]

Buchhold

[11] 3,739,291

[45] June 12, 1973

[54] HALF-WAVE BRIDGE TYPE MAGNETIC AMPLIFIER

[75] Inventor: Theodor Adam Buchhold, Schenectady, N.Y.

[73] Assignee: The Sperry Rand Corporation Ford Instrument Company, Division, Long Island, N.Y.

[22] Filed: Apr. 15, 1957

[21] Appl. No.: 653,030

[52] U.S. Cl. ...................... 330/8, 323/89 B, 330/63

[51] Int. Cl. ............................................. H03f 9/00

[58] Field of Search ............. 179/171 MA; 323/89, 323/89.1, 89.1 B; 330/8, 63, 89 B

[56] References Cited

UNITED STATES PATENTS

| | | | |
|---|---|---|---|
| 2,972,714 | 2/1961 | Suozzi | 323/89 B |
| 2,754,474 | 7/1956 | Barnhart | 323/89.1 B |
| 2,636,150 | 4/1953 | McKenney | 179/171 MA |
| 2,754,474 | 7/1956 | Barnhart | 179/171 MA |
| 2,839,617 | 6/1858 | Davis | 179/171 MA |
| 2,753,518 | 7/1956 | Creveling | 179/171 MA |
| 2,792,547 | 5/1957 | Horton | 179/171 MA |
| 2,897,296 | 7/1959 | Buchhold | 323/89.1 B |

*Primary Examiner*—Samuel Feinberg
*Assistant Examiner*—H. A. Birmiel
*Attorney*—Borst and Borst

[57] ABSTRACT

A multistage magnetic amplifier having an a.c. line, each stage comprising a pair of closed magnetic circuits and two branch circuits connected across said a.c. line, each branch circuit including in series a reactor winding respectively disposed on one of said magnetic circuits an impedance and two unidirectional devices, said devices in each of the stages being poled in the same direction and the devices in successive stages being respectively oppositely poled, each stage also comprising a control circuit including two control windings, one control winding being disposed on each magnetic circuit, one control winding being arranged to aid the flux induced by the reactor winding of one core and the other control winding being arranged to oppose the flux induced by the reactor winding on the other core, and means conductively connecting the control circuit of the stages after the first stage to the branch circuits of the preceding stage at points between the two unidirectional devices in each branch circuit of the said preceding stage, and a single biasing resistor connected in shunt relation to the two unidirectional devices and the control circuit connection in one of said branch circuits.

3 Claims, 2 Drawing Figures

INVENTOR
THEODOR BUCHHOLD
BY Victor D. Borst
ATTORNEY

INVENTOR
THEODOR BUCHHOLD
BY Victor D. Borst
ATTORNEY

HALF-WAVE BRIDGE TYPE MAGNETIC AMPLIFIER

This invention relates to magnetic amplifier control systems and more particularly to improved circuit means for biasing half wave bridge type magnetic amplifiers.

A conventional half-wave bridge type magnetic amplifier is characterized by a bridge network for each stage comprising two reactors connected in branch circuits across an a.c. line, the branch circuits having similarly poled half-wave rectifiers so that they are pulsed by the same half-wave or the line voltage. Each reactor has in series with it an impedance serving as a voltage divider which optionally may be a winding disposed on the other magnetic core of said stage. The control current which governs the saturation of the reactor magnetic circuits of the first stage acts differentially or in a push-pull relation with respect to the reactor windings to effect a differential flux preconditioning of the two magnetic paths on the off half-cycle of the reactor windings. Each control winding after the first stage is connected for energization across the branch circuits between the reactor winding and the impedance of the respective branch circuit.

A conventional circuit expedient for biasing the reactor magnetic circuits to a desired quiescent flux level during the off-half cycle includes the separate shunting of each of the two unidirectional conducting devices provided in each reactor branch circuit with a resistor of selected value. This manner of biasing permits the flow of parasitic currents in the bridge network which impairs the gain and the linearity of the output response relative to the input signal. According to this invention the flow in the bridge network connecting one stage and its succeeding stage is precluded by shunting the bridge connection as well as the two unidirectional devices in each circuit by a single resistor.

A principal object of this invention is to provide an improved biasing circuit means for a half-wave bridge type magnetic amplifier.

In general, this invention contemplates the provision of a bridge type magnetic amplifier, which may be a multistage device, and a single, biasing resistive element shunting the two unidirectional devices required to be present in the bridge circuits of the amplifier.

The features of the invention will be understood more clearly from the following details description taken in conjunction with the accompanying drawing in which.

Figure 1:
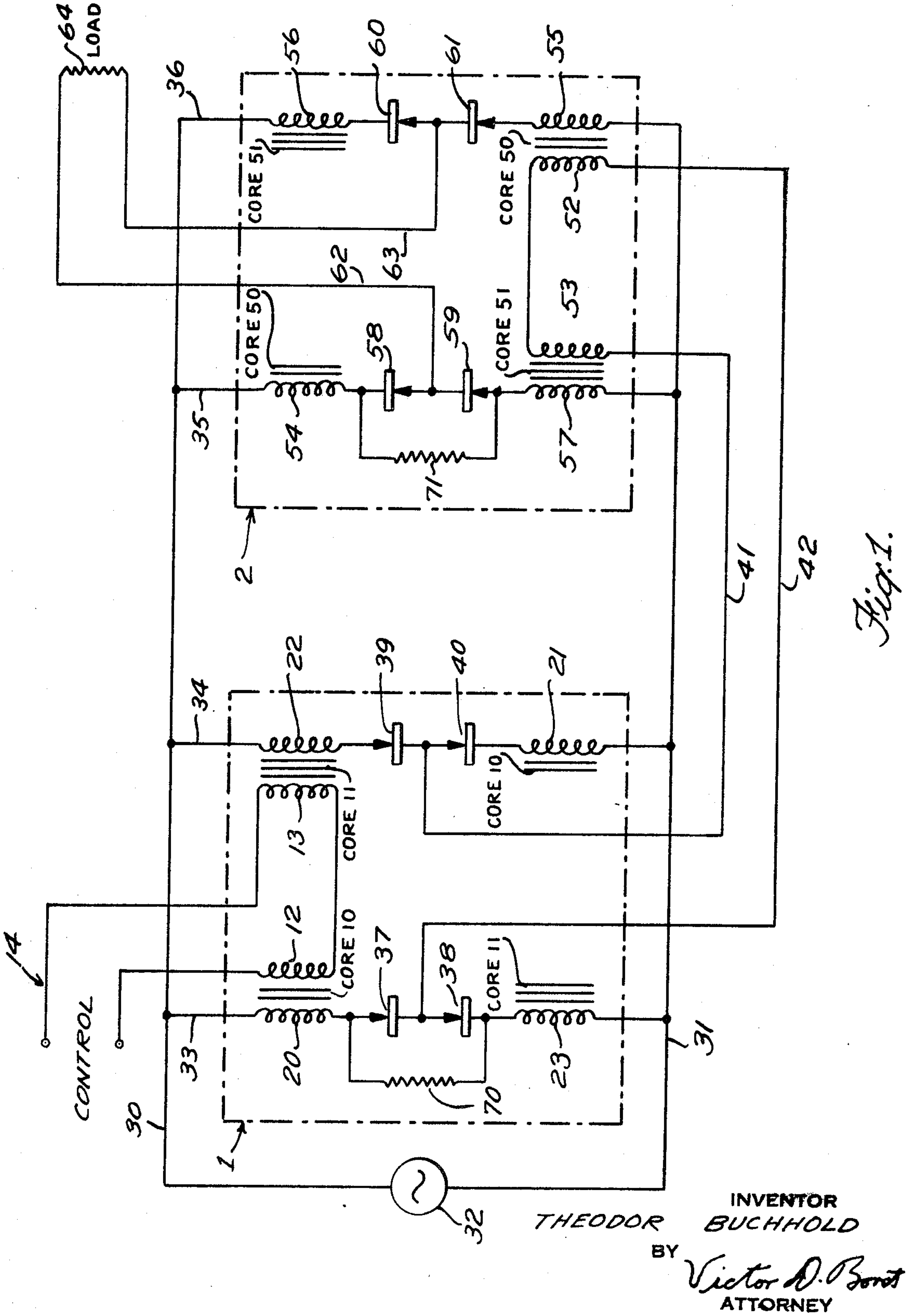
FIG. 1 is a schematic diagram of a two stage half wave amplifier employing a resistor for biasing each stage.

Referring to FIG. 1, there is provided two saturable reactor bridge networks 1 and 2 for the disclosed two stage amplifier. Bridge network 1 includes two closed saturable magnetic ring cores 10 and 11 on which respectively are disposed control windings 12 and 13. A d.c. control signal circuit 14 includes a series connection of the winding 12 and the winding 13.

Disposed on the ring cores 10 and 11 are reactor windings 20 and 21 and reactor windings 22 and 23, respectively. Connected to single phase alternating current lines 30 and 31, which receive energization from an alternating supply generator 32, are four branch circuits 33, 34, 35 and 36. Branch circuit 33 comprises a series circuit of the winding 20, a half-wave rectifier 37 poled away from the line 30, a half wave rectifier 38 poled toward the line 31 and the winding 23. Branch circuit 34 comprises a series circuit of the winding 22, a half wave rectifier 39 poled away from the line 30, a half wave rectifier 40 poled towards the line 31, and the winding 21. The output of the first amplifier stage appears between conductors 41 and 42 which are connected respectively to the junction points between the two unidirectional devices in branches 33 and 34 respectively in the bridge network 1.

Bridge network 2 includes two closed saturable magnetic ring cores 50 and 51 on which respectively are disposed control windings 52 and 53. An input circuit to the bridge network 2 comprises in series connection the windings 52 and 53 across the conductors 41 and 42. Disposed on the ring cores 50 and 51 are reactor windings 54 and 55 and reactor windings 56 and 57, respectively. Branch circuit 35 comprises a series circuit of the winding 54, a half-waVe rectifier 58 poled towards the line 30, a half-wave rectifier 59 poled away from the line 31, and the winding 57. Branch circuit 36 comprises the winding 56, a half-wave rectifier 60 poled towards the line 30, a half-wave rectifier 61 poled away from the line 31 and the winding 55. The output voltage of the bridge network 2 appears across the conductors 62 and 63 which are connected to the junction points between the two half-wave rectifiers in branches 35 and 36, respectively. The output conductors 62 and 63 terminate in a load 64. The two reactor windings on each of the cores 10, 11, 50 and 51 are wound and sensed to induce similarly directed fluxes in their associated cores. The current through the load is half wave unidirectional the polarity of which is determined by the direction of the current through the control circuit 14. The signal on the load 64 is an amplified reproduction of the d.c. signal on the control circuit 14. Typically, the load may comprise a high-performance servo mechanism system which is thus enabled to be controlled by a relatively small signal appearing in the control circuit of the amplifier.

A resistor 70 is shunted across the two half-wave rectifiers 37 and 38 for controlling the reverse current in branch circuit 33 during the off-half cycle of the bridge network 1 when the applied signal in the control circuit 14 is zero and thereby serves as a biasing resistor for the first amplifier stage. This reverse current in branch circuit 33 through the resistor 70 will establish the operating point on the hysteresis curve for the cores 10 and 11 at the desired quiescent level. The disclosed means for biasing the magnetic circuits of one amplifier stage by shunting the two half-wave rectifiers with one resistor prevents the flow of parasitic circulating current in the associated bridge network as induced therein by a signal current in the control windings. Such a parasitic circulating current flows when each half-wave rectifier is shunted by a separate resistor in the normal manner. Referring to the schematic diagram in network 1 there is a closed current path in the circuit comprising: conductor 42, winding 52, winding 53, conductor 41, half-wave rectifier 40, winding 21, line 31, winding 23, resistor 70 and the half-wave rectifier 37. In the off half-cycle for network 1, the voltage induced in the winding 21 on core 10 due to the control signal current in winding 12 on core 10 adds in phase with the voltage induced in the winding 23 on core 11 due to the control signal current in the winding 13 on core 11 and a parasitic current would flow in the hereinbefore stated circuit if each half-wave rectifier were shunted in the usual manner by a separate bias resistor. For the biasing circuit means disclosed, the voltage drop across half-wave rectifier 37 during the off half-cycle is greater than and opposes the voltages induced in the windings 21 and 23 and therefore no parasitic circulating current can flow to impair the gain and linear output response to the amplifier. In a similar manner, a resistor 71 shunting both half-wave rectifiers 58 and 59 biases the second amplifier stage.

Figure 2:
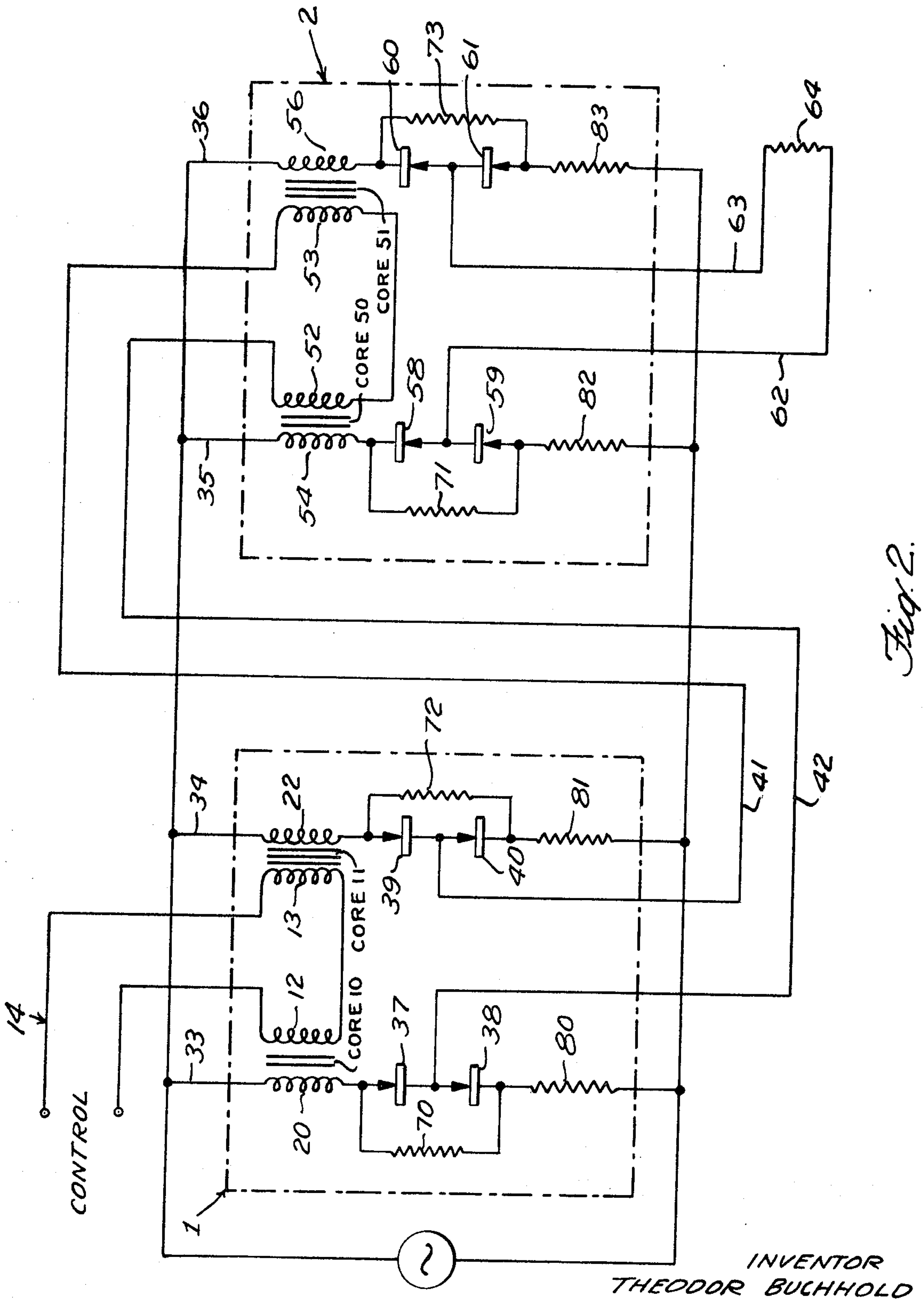
FIG. 2 is a modified schematic diagram of FIG. 1.

In the modified two stage half-wave amplifier of FIG. 2, the reactor windings 23, 21, 57 and 55 are replaced by resistors 80, 81, 82 and 83 respectively, and preferably, these resistors all have an equal resistive value. Two additional biasing resistors 72 and 73 shunt the two half-wave rectifiers in the branches 34 and 36 to provide biasing means for the bores 11 and 51, respectively.

It is to be understood that various modifications of the invention other than those described may be effected by persons skilled in the art without departing from the principle and scope of the invention as defined in the appended claims.

What is claimed is:

1. A multistage magnetic amplifier having an a.c. line, each stage comprising a pair of closed magnetic circuits and two branch circuits connected across said a.c. line, each branch circuit including in series a reactor winding respectively disposed on one of said magnetic circuits an impedance and two unidirectional devices, said devices in each of the stages being poled in the same direction and the devices in successive stages being respectively oppositely poled, each stage also comprising a control circuit including two control windings, one control winding being disposed on each magnetic circuit, one control winding being arranged to aid the flux induced by the reactor winding of one core and the other control winding being arranged to oppose the flux induced by the reactor winding on the other core, means conductively connecting the control circuit of the stages after the first stage to the branch circuits of the preceding stage at points between the two unidirectional devices in each branch circuit of the said preceding stage, and a single biasing resistor connected in shunt relation to the two unidirectional devices and the control circuit connection in one of said branch circuits.

2. A multistage magnetic amplifier as claimed in claim 1 wherein a second biasing resistor is shunted across the said two devices and the control circuit connection in the other of said branch circuits in each stage.

3. A multistage magnetic amplifier as claimed in claim 1 wherein the impedances in each stage are reactor windings, each reactor winding in each stage being disposed upon one of the said two magnetic circuits in that stage, and each of the said two branch circuits in that stage including one of the first-mentioned reactor windings disposed upon one of the said two magnetic circuits in that stage and one of the said reactor windings disposed upon the other of the said two magnetic circuits in that stage.

* * * * *